US011416302B2

(12) United States Patent
Harada et al.

(10) Patent No.: US 11,416,302 B2
(45) Date of Patent: Aug. 16, 2022

(54) COMPUTER SYSTEM AND METHOD FOR DETERMINING OF RESOURCE ALLOCATION

(71) Applicant: Hitachi, Ltd., Tokyo (JP)

(72) Inventors: Kunihiko Harada, Tokyo (JP); Takeshi Uehara, Tokyo (JP); Kazuaki Tokunaga, Tokyo (JP); Toshiyuki Ukai, Tokyo (JP)

(73) Assignee: HITACHI, LTD., Tokyo (JP)

( * ) Notice: Subject to any disclaimer, the term of this patent is extended or adjusted under 35 U.S.C. 154(b) by 45 days.

(21) Appl. No.: 17/007,024

(22) Filed: Aug. 31, 2020

(65) Prior Publication Data

US 2021/0200590 A1 Jul. 1, 2021

(30) Foreign Application Priority Data

Dec. 26, 2019 (JP) ............................ JP2019-237151

(51) Int. Cl.
*G06F 9/46* (2006.01)
*G06F 9/50* (2006.01)

(52) U.S. Cl.
CPC .................................... *G06F 9/505* (2013.01)

(58) Field of Classification Search
CPC ....................................................... G06F 9/505
See application file for complete search history.

(56) References Cited

U.S. PATENT DOCUMENTS

2008/0228551 A1 9/2008 Yamanaka
2021/0118054 A1* 4/2021 Turner ............... G06Q 10/0631
2021/0200590 A1* 7/2021 Harada ................... G06F 9/505

FOREIGN PATENT DOCUMENTS

JP 2008-226178 A 9/2008
JP 2006-350832 A 12/2016

* cited by examiner

*Primary Examiner* — Camquy Truong
(74) *Attorney, Agent, or Firm* — Mattingly & Malur, PC

(57) ABSTRACT

A computer system determines an allocation of resources in a task formed of processes. The task includes a transition between processes corresponding to rework. The computer system comprises: at least one predictor configured to calculate predicted values of an inflow amount and an outflow amount of the items of each of the processes forming the task; and a resource allocation determining unit configured to determine an allocation of the resources to each of the processes. The resource allocation determining unit uses the at least one predictor to form a simulator configured to calculate the predicted values of the inflow amount and the outflow amount of the items of each of the processes in any allocation of the resources, in a case of receiving a request including a constraint condition of the resources and an optimization condition; and determines the allocation of the resources to each of the processes.

10 Claims, 9 Drawing Sheets

131

| ITEM IDENTIFIER (301) | PROCESS NAME (302) | START TIME POINT (303) | END TIME POINT (304) | RESOURCE (305) |
|---|---|---|---|---|
| 1 | PROCESS A | 2019/03/03 08:45:16 | 2019/03/03 09:01:11 | 5 |
| 2 | PROCESS A | 2019/03/03 08:46:31 | 2019/03/03 08:55:53 | 6 |
| 2 | PROCESS B | 2019/03/03 08:57:02 | 2019/03/03 09:20:18 | 4 |
| 3 | PROCESS A | 2019/03/03 08:57:35 | 2019/03/03 09:22:45 | 4 |
| 1 | PROCESS B | 2019/03/03 09:03:53 | 2019/03/03 10:00:32 | 2 |
| 2 | PROCESS C | 2019/03/03 09:20:55 | 2019/03/03 09:22:31 | 1 |
| 2 | PROCESS A | 2019/03/03 09:25:20 | 2019/03/03 09:40:43 | 1 |
| ... | ... | ... | ... | ... |

132

| TIME SLOT (401) | AIR TEMPERATURE (402) | HUMIDITY (403) | WEATHER (404) | POLLEN AMOUNT (405) |
|---|---|---|---|---|
| 2019/03/03 08:00-09:00 | 15 | 40% | FINE | ... |
| 2019/03/03 09:00-10:00 | 18 | 40% | FINE | ... |
| 2019/03/03 10:00-11:00 | 20 | 60% | FINE | ... |
| 2019/03/03 11:00-12:00 | 22 | 50% | FINE | ... |
| ... | ... | ... | ... | ... |

| PROCESS NAME (501) | PREDICTOR (OUTFLOW AMOUNT) (502) | PREDICTOR (INFLOW AMOUNT) (503) |
|---|---|---|
| PROCESS A | MODEL A_out | MODEL A_in |
| PROCESS B | MODEL B_out | MODEL B_in |
| PROCESS C | MODEL C_out | MODEL C_in |
| PROCESS D | MODEL D_out | MODEL D_in |
| PROCESS E | MODEL E_out | MODEL E_in |

| TIME SLOT (601) | MAXIMUM RESOURCES (602) |
|---|---|
| 2019/03/03 8:00-9:00 | 10 |
| 2019/03/03 9:00-10:00 | 15 |
| 2019/03/03 10:00-11:00 | 15 |
| 2019/03/03 11:00-12:00 | 8 |
| 2019/03/03 12:00-13:00 | 7 |
| 2019/03/03 13:00-14:00 | 15 |
| 2019/03/03 14:00-15:00 | 5 |

| | W1 | W2 | W3 | W4 |
|---|---|---|---|---|
| 2019/03/03 8:00-9:00 | ○ | | | ○ |
| 2019/03/03 9:00-10:00 | ○ | ○ | ○ | ○ |
| 2019/03/03 10:00-11:00 | ○ | ○ | ○ | ○ |
| 2019/03/03 11:00-12:00 | ○ | | ○ | |
| 2019/03/03 12:00-13:00 | | ○ | | |
| 2019/03/03 13:00-14:00 | ○ | ○ | ○ | |
| 2019/03/03 14:00-15:00 | | ○ | ○ | |

612

| | W1 | W2 | W3 | W4 |
|---|---|---|---|---|
| PROCESS A | ○ | | | ○ |
| PROCESS B | | ○ | ○ | ○ |
| PROCESS C | ○ | | ○ | ○ |
| PROCESS D | ○ | | ○ | |
| PROCESS E | | ○ | | |

| TIME SLOT | INFLOW AMOUNT |
|---|---|
| 2019/03/03 8:00-9:00 | 30 |
| 2019/03/03 9:00-10:00 | 55 |
| 2019/03/03 10:00-11:00 | 75 |
| 2019/03/03 11:00-12:00 | 75 |
| 2019/03/03 12:00-13:00 | 40 |
| 2019/03/03 13:00-14:00 | 21 |
| 2019/03/03 14:00-15:00 | 0 |

| | PROCESS A | PROCESS B | PROCESS C | PROCESS D | PROCESS E |
|---|---|---|---|---|---|
| 2019/03/03 08:00 – 09:00 | 5 | 2 | 1 | 1 | 1 |
| 2019/03/03 09:00 – 10:00 | 5 | 4 | 3 | 2 | 1 |
| 2019/03/03 10:00 – 11:00 | 5 | 4 | 3 | 2 | 1 |
| 2019/03/03 11:00 – 12:00 | 2 | 2 | 2 | 1 | 1 |
| 2019/03/03 12:00 – 13:00 | 1 | 1 | 2 | 2 | 1 |
| 2019/03/03 13:00 – 14:00 | 1 | 2 | 3 | 4 | 5 |
| 2019/03/03 14:00 – 15:00 | 0 | 0 | 1 | 1 | 3 |

*FIG. 8*

| | PROCESS A | PROCESS B | PROCESS C | PROCESS D | PROCESS E |
|---|---|---|---|---|---|
| 2019/03/03 08:00 – 09:00 | 5 | 2 | 1 | 1 | 1 |
| 2019/03/03 09:00 – 10:00 | 5 | 4 | 3 | 2 | 1 |
| 2019/03/03 10:00 – 11:00 | 5 | 4 | 3 | 2 | 1 |
| 2019/03/03 11:00 – 12:00 | 2 | 2 | 2 | 1 | 1 |
| 2019/03/03 12:00 – 13:00 | 1 | 1 | 2 | 2 | 1 |
| 2019/03/03 13:00 – 14:00 | 1 | 2 | 3 | 4 | 5 |
| 2019/03/03 14:00 – 15:00 | 0 | 0 | 1 | 1 | 3 |

COMPUTER SYSTEM AND METHOD FOR DETERMINING OF RESOURCE ALLOCATION

CLAIM OF PRIORITY

The present application claims priority from Japanese patent application JP 2019-237151 filed on Dec. 26, 2019, the content of which is hereby incorporated by reference into this application.

BACKGROUND OF THE INVENTION

This invention relates to a technology for determining an allocation of resources for achieving a predetermined object.

In recent years, use of machine learning and artificial intelligence (AI) has been widespread in various fields in order to achieve a reduction in cost and an increase in efficiency of a task.

In an allocation of resources represented by persons, knowledge and experience in each task are required, and thus the allocation of resources come to depend on individual knowledge and experience. Consequently, it has become difficult to secure employment for maintaining such knowledge and experience. Therefore, achievement of a resource allocation through use of the machine learning and the AI has increasingly been expected.

Technologies for achieving the resource allocation are described in JP 2006-350832 A and JP 2008-226178 A.

In JP 2006-350832 A, there is disclosed "A work distribution apparatus for quickly switching persons among processes of a production line for producing products, the work distribution apparatus including: a production record collection unit configured to collect production record data on the products; a line-out record collection unit configured to collect data on defective products; a repair record collection unit configured to collect data on repaired products; a production plan master configured to store a production plan of the products; a production record master configured to store the production record data collected by the production record collection unit; a line-out master configured to store the data collected by the line-out record collection unit; a repair record master configured to store the data collected by the repair record collection unit; a repair-period-by-cause-of-defect master configured to store a required repair period for each cause of a defect of the product; a personnel master configured to store management data on direct workers who assemble the products, and indirect works who repair the defective products; a working hour master configured to manage at least the latest time point of overtime work of the production line; a management unit configured to manage writing and reading of data to and from the production record master, the line-out master, and the repair record master; an arithmetic unit configured to switch the direct workers and the indirect works to determine a personnel arrangement and a work distribution, based on the data of each of the production plan master, the production record master, the line-out master, the repair record master, the repair-period-by-cause-of-defect master, the personnel master, and the working hour master; and a result output unit configured to output results of the personnel arrangement and the work distribution obtained by the arithmetic unit."

In JP 2008-226178 A, it is described that "The optimization control part 140 uses the optimum gradient method to provide control so that the personnel assignment is optimized while using the simulator 130 for the simulation, the increase and decrease personnel assignment calculation part 150 uses the approximation model to calculate the increase and decrease personnel assignment for the optimization control part 140 to find the next tentative optimum solution, and the initial value generation part 160 generates the initial value by using the approximation mode. In addition, the personnel assignment information storage 120 stores the information required for optimizing the personnel assignment, and the simulator 130, the optimization control part 140, and the increase and decrease personnel assignment calculation part 150 perform processing while referring to and updating the information of the personnel assignment information storage part 120."

SUMMARY OF THE INVENTION

The technology described in JP 2006-350832 A cannot handle "rework," in which a destination process of a certain process is changed depending on a result of inspection in a task, for example, an assembly task formed of a plurality of processes. For example, this technology cannot handle a task including rework such as a transition from a certain process to a process executed before, or a task including a plurality of transition paths from a certain process. Moreover, the technology described in JP 2008-226178 A does not consider an existence of processes.

This invention has been made in view of the above-mentioned circumstances, and has an object to provide a technology for determining an optimal allocation of resources, for example, persons, in consideration of rework of a plurality of processes.

A representative example of the present invention disclosed in this specification is as follows: a computer system includes at least one computer, and is configured to determine an allocation of resources in a task formed of a plurality of processes of processing items through use of the resources. The at least one computer includes an arithmetic device, a storage device, and an interface, the storage device being coupled to the arithmetic device, the interface being coupled to the arithmetic device and being configured to couple to an external device. The task including a transition between processes corresponding to rework. The computer system comprises: at least one predictor configured to calculate predicted values of an inflow amount and an outflow amount of the items of each of the plurality of processes forming the task; and a resource allocation determining unit configured to determine an allocation of the resources to each of the plurality of processes. The resource allocation determining unit being configured to: use the at least one predictor to form a simulator configured to calculate the predicted values of the inflow amount and the outflow amount of the items of each of the plurality of processes in any allocation of the resources, in a case of receiving a request including a constraint condition of the resources and an optimization condition; and determine the allocation of the resources to each of the plurality of processes based on the simulator, the constraint condition of the resources, and the optimization condition.

According to at least one embodiment of this invention, an optimal allocation of resources can be determined in a task including a transition between the processes, for example, rework. Other problems, configurations, and effects than those described above will become apparent in the descriptions of embodiments below.

BRIEF DESCRIPTION OF THE DRAWINGS

The present invention can be appreciated by the description which follows in conjunction with the following figures, wherein:

FIG. 4 is a table for showing an example of the data structure of environmental data information in the first embodiment;

FIG. 5 is a table for showing an example of the data structure of predictor information in the first embodiment;

FIG. 6A and FIG. 6B are tables for showing examples of the data structure of resource constraint information in the first embodiment;

FIG. 7 is a table for showing an example of the data structure of first process inflow information in the first embodiment;

FIG. 8 is a table for showing an example of the data structure of resource allocation information in the first embodiment;

DETAILED DESCRIPTION OF THE PREFERRED EMBODIMENTS

Figure 1:
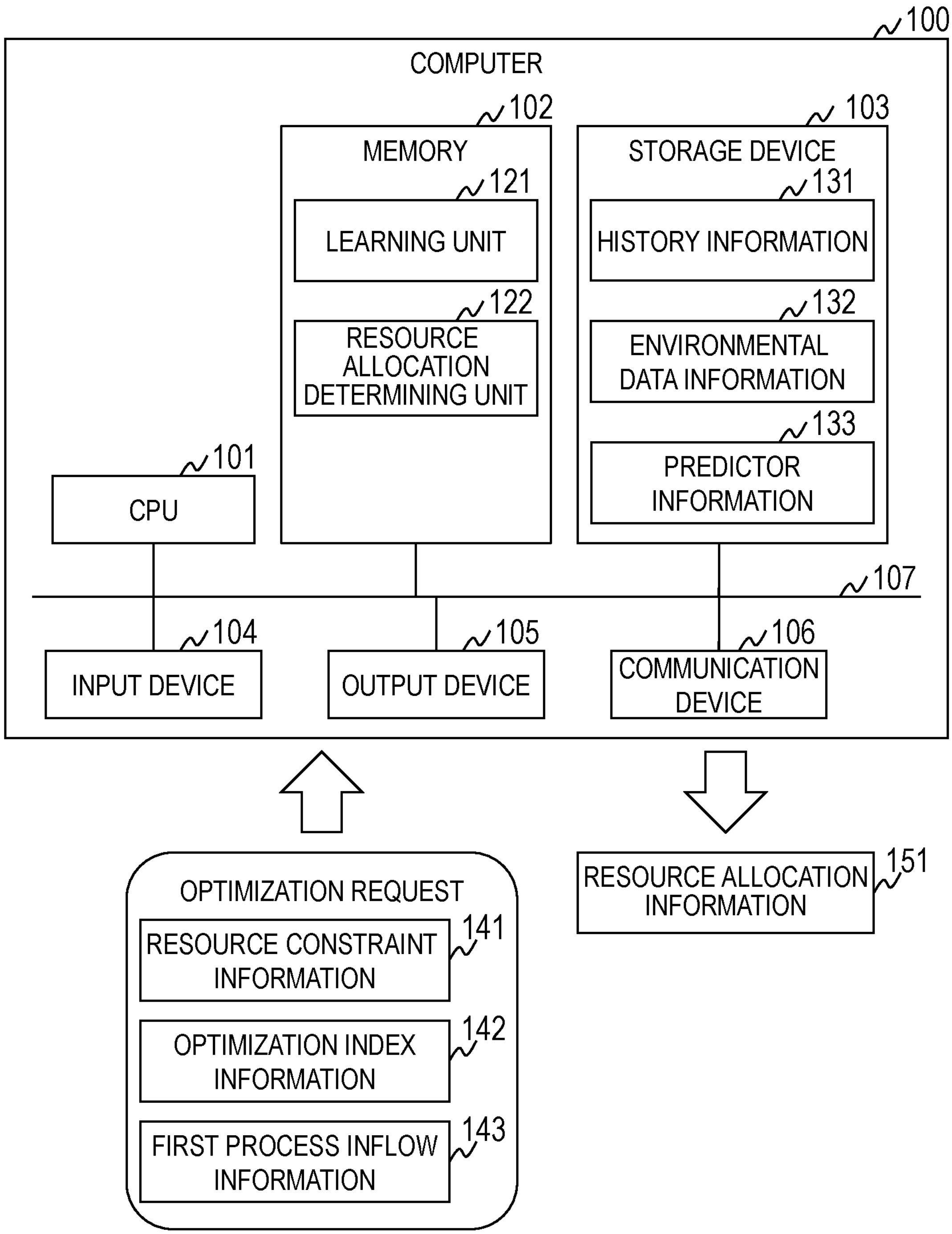
FIG. 1 is a diagram for illustrating an example of a configuration of a computer in a first embodiment of this invention.

Now, a description is given of an embodiment of this invention referring to the drawings. It should be noted that this invention is not to be construed by limiting the invention to the content described in the following embodiment. A person skilled in the art would easily recognize that a specific configuration described in the following embodiment may be changed within the scope of the concept and the gist of this invention.

In a configuration of this invention described below, the same or similar components or functions are assigned with the same reference numerals, and a redundant description thereof is omitted here.

Notations of, for example, "first", "second", and "third" herein are assigned to distinguish between components, and do not necessarily limit the number or order of those components.

The position, size, shape, range, and others of each component illustrated in, for example, the drawings may not represent the actual position, size, shape, range, and other metrics in order to facilitate understanding of this invention. Thus, this invention is not limited to the position, size, shape, range, and others described in, for example, the drawings.

First Embodiment

Figures 2, 3:
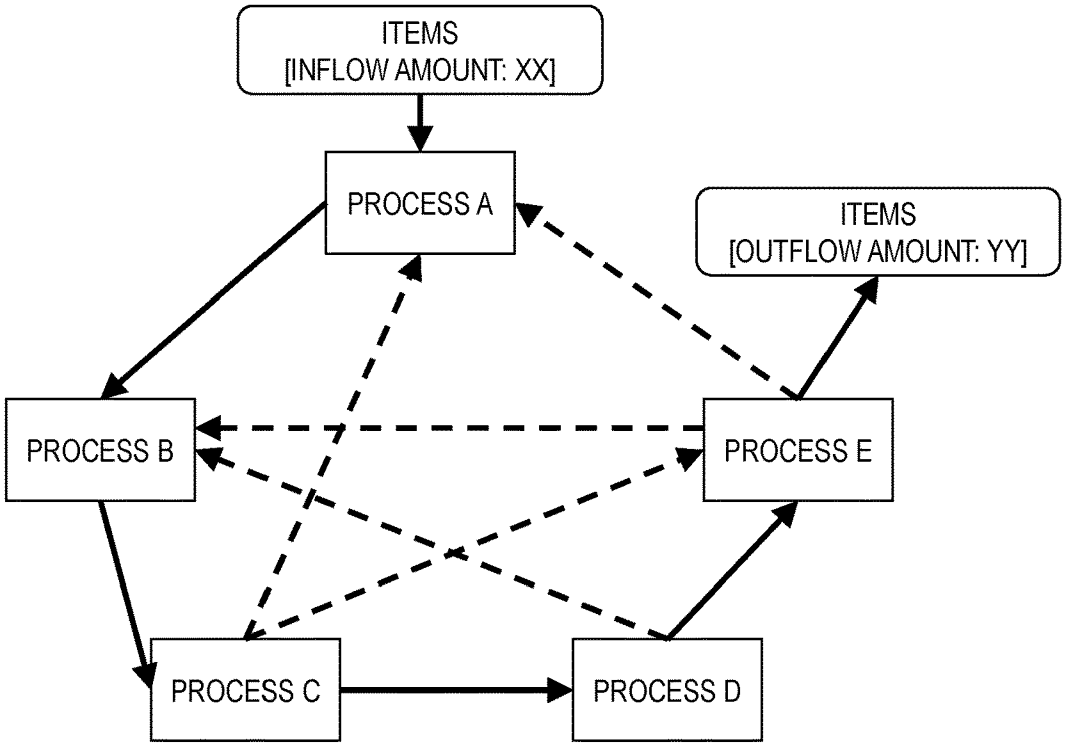
FIG. 2 is a diagram for illustrating an example of a task in the first embodiment.
FIG. 3 is a table for showing an example of the data structure of history information in the first embodiment.

FIG. 1 is a diagram for illustrating an example of a configuration of a computer 100 in a first embodiment of this invention. FIG. 2 is a diagram for illustrating an example of a task in the first embodiment.

The computer 100 is configured to determine, based on constraint conditions, an optimal allocation of resources in a task formed of a plurality of processes for processing items. More specifically, the computer 100 is configured to determine an allocation of the resources to each process so that an index serving as an object of the task is optimal, based on constraint conditions relating to the resources.

Herein, description is given of embodiments while a case in which persons are treated as the resources is exemplified. Facilities may be treated as the resources. Moreover, this invention can also be applied to a case in which an allocation of resources of different types, such as the persons and the facilities, are determined. Further, this invention can also be applied to a data processing task. For example, data may be considered as an item, and a program may be considered as the resource.

This invention is applied to a task formed of processes on transition paths of items as illustrated in FIG. 2. The solid arrows indicate normal transition directions of the items. The dotted arrows indicate special transition directions of the items. For example, the item processed in a process D may return to a process B or may transition to a process E in accordance with a state of the item or the like. Moreover, the item processed in a process C may transition to the process D or may transition to the process E without intermediation of the process D in accordance with a state of the item or the like. In the task illustrated in FIG. 2, an inflow amount of the items to each process and an outflow amount of the items from each process cannot be estimated in advance. Moreover, the inflow amount and the outflow amount of the items change also in accordance with a time (time point and season) at which the task is executed.

In the related art, a processing period of each process and an amount of inflow of the items of the process are treated as fixed values, and factors relating to the time, such as the time slot and the season, cannot be adopted. In contrast, this invention solves the above-mentioned problems, and determines an optimal allocation of the resources.

Description is now given of terms and notations used herein.

"Item" indicates the minimum unit to be processed in the task. "Process" indicates the minimum unit of the processing applied to the item. "Resource" indicates an element required to achieve the processing in the process. For example, in a case of an assembly task, the item is a product (component). The process is a manufacturing process for the product. The resource is a person and a production facility.

In at least one embodiment of this invention, a task in which an item may flow from a process of an output destination to a process of an output source is assumed. For example, this is such a flow that, in a manufacturing task, when a defect of a product is found as a result of an inspection process, this product is returned to a processing process.

The notations herein are defined as follows.

Herein, the process is represented by $p_i$. A suffix i is a character for identifying the process, and is an integer of from 1 to n in the first embodiment. Processes $p_1$ and $p_n$ indicate a first process and a last process of the task, respectively.

Herein, a set of the processes is represented by P.

In this case, the task is represented by a graph in which the set P is a set of entire nodes, and a sub set V of a direct product set P×P is a set of entire arcs. It should be noted that the first process and the last process are not always defined, but generality is retained by virtually adding the node $p_1$, the node $p_n$, and arcs ($p_1$, p) and ($p_n$, p) (p is all elements of the set F).

Herein, a set of the entire resources (workers) is represented by W.

It should be noted that (P, V) defines the task, and the task is not always required to be executed at one location. Herein, a set of entire locations is represented by L.

Herein, an inflow amount and an outflow amount of the items of a process p in a time slot t at a certain location/are represented by $v^i_{l,p,t}$ and $v^o_{l,p,t}$, respectively. When the number of the locations is only one, the inflow amount and the outflow amount of the items are represented by $v^i_{p,t}$ and $v^o_{p,t}$, respectively.

Herein, a set of entire time slots is represented by T.

Description is again given of FIG. 1. The computer 100 is, for example, a personal computer, a server, or a workstation, and includes a central processing unit (CPU) 101, a memory 102, a storage device 103, an input device 104, an output device 105, and a communication device 106. The hardware components are coupled to one another by a bus 107.

The CPU 101 is configured to execute a program stored in the memory 102. The CPU 101 operates as a function unit (module) configured to implement a specific function by executing processing in accordance with the program. In the following description, a sentence describing processing with a function unit as the subject of the sentence means that a program for implementing the function unit is executed by the CPU 101.

The memory 102 is a storage device, for example, a dynamic random access memory (DRAM), and is configured to store programs to be executed by the CPU 101 and information to be used by the CPU 101. Moreover, the memory 102 includes a work area to be temporarily used by the CPU 101. Description is later given of the programs stored in the memory 102.

It should be noted that the programs and information stored in the memory 102 may be stored in the storage device 103. In this case, the CPU 101 reads out the programs and the information from the storage device 103, loads the programs and the information onto the memory 102, and executes the programs stored in the memory 102.

The storage device 103 is a hard disk drive (HDD), a solid state drive (SSD), or other such storage device, and is configured to permanently store data. Description is later given of the information stored in the storage device 103. It should be noted that the storage device 103 may be a drive device for a storage medium such as a compact disc recordable (CD-R), a digital versatile disc-random access memory (DVD-RAM), or a silicon disk. In this case, the information and the programs are stored in the storage medium.

The input device 104 is, for example, a keyboard, a mouse, a scanner, a microphone, or the like, and is a device configured to input data to the computer 100. The output device 105 is a display, a printer, a speaker, or the like, and is a device configured to output data from the computer 100 to the outside. The communication device 106 is a device configured to execute communication through a network, for example, a local area network (LAN).

Description is now given of the information stored in the storage device 103 and the programs stored in the memory 102.

The storage device 103 stores history information 131, environmental data information 132, and predictor information 133.

The history information 131 is information for managing histories of the processing of the items in the processes. Details of a data structure of the history information 131 are described later with reference to FIG. 3.

The environmental data information 132 is information for managing data on an environment affecting the task. Details of a data structure of the environmental data information 132 are described later with reference to FIG. 4.

The predictor information 133 is information for managing predictors configured to predict the inflow amount and the outflow amount of the items of each process. Details of a data structure of the predictor information 133 are described later with reference to FIG. 5.

The memory 102 is configured to store programs for implementing a learning unit 121 and a resource allocation determining unit 122.

The learning unit 121 is configured to execute, based on the history information 131 and the environmental data information 132, leaning processing for generating a predictor (outflow amount predictor) configured to calculate a predicted value of the outflow amount of the items of each process and a predictor (inflow amount predictor) configured to calculate a predicted value of the inflow amount of the items of each process. The learning unit 121 is configured to set the generated predictors to the predictor information 133.

The predictor configured to calculate the predicted value of the outflow amount is configured to receive a time slot, an inflow amount in a time slot before the time slot, a resource allocation plan to the process in the time slot, and the environmental data as inputs. The predictor configured to calculate the predicted value of the inflow amount is configured to receive a time slot, outflow amounts in the time slot before the time slot in other processes, and the environmental data as inputs. Each of the predictors may be configured to receive, as inputs, input inflow amounts or outflow amounts of unprocessed items in time slots before the input time slot.

The resource allocation determining unit 122 is configured to receive an optimization request including resource constraint information 141, optimization index information 142, and first process inflow information 143 through the input device 104 or the communication device 106. The optimization request also includes information, for example, a target time width within a target of optimization.

The resource constraint information 141 is information on constraints on the resources. The optimization index information 142 is information on the index serving as the target used when the allocation of the resources is to be determined. The first process inflow information 143 is information on the inflow amount of the items to the first process. Details of the data structure of the resource constraint information 141 are described later with reference to FIG. 6A and FIG. 6B. Details of the data structure of the first process inflow information 143 are described later with reference to FIG. 7.

The resource constraint information 141, the optimization index information 142, and the first process inflow information 143 included in the received optimization request are stored in any one of the memory 102 and the storage device 103.

In a case where the resource allocation determining unit 122 receives the optimization request, the resource allocation determining unit 122 calculates predicted values of the inflow amount and the outflow amount of each process in each time slot in a certain allocation of the resources based on the first process inflow information 143 and the predictors, to thereby form a simulator. Further, the resource allocation determining unit 122 uses the above-mentioned simulator, to thereby determine an allocation of the resources to each process based on the resource constraint information 141 and the optimization index information 142. In the first embodiment, the above-mentioned simulator is implemented as constraint formulae of mixed integer programming. The resource allocation determining unit 122 outputs determined resource allocation information 151 including allocation results of the resources to each process through the output device 105 or the communication device 106. Details of a data structure of the resource allocation information 151 are described later with reference to FIG. 8.

Regarding each function unit of the computer 100, a plurality of function units may be combined into one function unit, or one function unit may be divided into a plurality of function units each corresponding to a function.

Moreover, at least one embodiment of this invention may be implemented as a computer system in which the respective function units of the computer 100 are distributed and allocated to a plurality of computers. For example, a computer system formed of a computer including the learning unit 121, a computer including the resource allocation determining unit 122, and a storage system configured to store each piece of information is conceivable.

FIG. 3 is a table for showing an example of the data structure of the history information 131 in the first embodiment.

The history information 131 stores records each including an item identifier 301, a process name 302, a start time point 303, an end time point 304, and a resource 305. One record exists for one history.

The item identifier 301 is a field for storing identification information on the item. The process name 302 is a field for storing a name of a process. The start time point 303 is a field for storing a time point at which the processing of the process was started. The end time point 304 is a field for storing a time point at which the processing of the process was finished. The resource 305 is a field for storing the number of allocated persons.

In the first embodiment, it is assumed that processing procedures of a plurality of processes are not applied to one item at the same time point. However, the above-mentioned assumption is for the convenience of description, and does not limit this invention.

It should be noted that the fields included in one record are an example, and the fields are not limited to this example. The record may not include all of the fields shown in FIG. 3, or may include other fields (not shown). For example, the record may not include the end time point 304. In this case, it is assumed that the processing of a certain process is executed from the start time point of the certain process to the start time point of a next process.

FIG. 4 is a table for showing an example of the data structure of the environmental data information 132 in the first embodiment.

The environmental data information 132 stores records each including a time slot 401, an air temperature 402, a humidity 403, a weather 404, and a pollen amount 405. One record exists for one time slot.

The time slot 401 is a field for storing a time slot in which data on the environment was measured. The air temperature 402, the humidity 403, the weather 404, and the pollen amount 405 are fields for storing data on the environment affecting the task.

It should be noted that the fields included in one record are an example, and the fields are not limited to this example. The record may not include all of the fields shown in FIG. 4, or may include other fields not shown. For example, the record may include fields such as a physical condition and a working period of the worker.

FIG. 5 is a table for showing an example of the data structure of the predictor information 133 in the first embodiment.

The predictor information 133 stores records each including a process name 501, a predictor (outflow amount) 502, and a predictor (inflow amount) 503. One record exists for one process.

The process name 501 is the same field as the process name 302. The predictor (outflow amount) 502 is a field for storing information on the predictor configured to calculate the outflow amount of the items from the process. The predictor (inflow amount) 503 is a field for storing information on the predictor configured to calculate the inflow amount of the items to the process.

It should be noted that the fields included in one record are an example, and the fields are not limited to this example.

FIG. 6A and FIG. 6B are tables for showing examples of the data structure of the resource constraint information 141 in the first embodiment.

FIG. 6A is a table for showing the data structure of the resource constraint information 141 having a table form. The resource constraint information 141 stores records each including a time slot 601 and a maximum resources 602. One record exists for one time slot.

The time slot 601 is a field for storing a time slot in which the resources are to be allocated. The maximum resources 602 is a field for storing the maximum value of the number of resources that can be allocated. For example, the uppermost record indicates that the maximum number of the workers is 10 in a time slot from 8 o'clock to 9 o'clock on 3/3/2019.

FIG. 6B is a table for showing the data structure of the resource constraint information 141 having a matrix form. The resource constraint information 141 includes working period information 611 and allocable process specification information 612.

The working period information 611 is information having a matrix form in which a time slot is assigned to each row, a person is assigned to each column, and a value indicating whether or not a person corresponding to the column can work in a time slot corresponding to the row is stored in each cell. Specifically, a symbol of a circle is stored in a cell when a person can work in a certain time slot.

The allocable process specification information 612 is information having a matrix form in which a process is assigned to each row, a person is assigned to each column, and a value indicating whether or not a person corresponding to the column can be allocated to the process corresponding to the row is stored in each cell.

In the resource constraint information 141 shown in FIG. 6A, only the maximum value of the resources in each time slot is constrained. In the resource constraint information 141 shown in FIG. 6B, the working periods and the allocable processes of each worker are constrained.

It should be noted that the data structures of the resource constraint information 141 shown in FIG. 6A and FIG. 6B are examples, and are not limited to those examples.

FIG. 7 is a table for showing an example of the data structure of the first process inflow information 143 in the first embodiment.

The first process inflow information 143 stores records each including a time slot 701 and an inflow amount 702. One record exists for one time slot.

The time slot 701 is the same field as the time slot 401. The inflow amount 702 is a field for storing the inflow amount of the items to the first process.

FIG. 8 is a table for showing an example of the data structure of the resource allocation information 151 in the first embodiment.

The resource allocation information 151 shown in FIG. 8 is information having a matrix form in which a time slot is assigned to each row, and a process is assigned to each column. The number of resources to be allocated to a process corresponding to a column in a time slot corresponding to a row is stored in each cell.

The width of the time slots can be freely set in the information described with reference to FIG. 3 to FIG. 8.

Next, description is given of the optimization index information 142.

In a case of optimization having an object of maximizing an outflow amount of the items from the final process in a task executed at one location, that is, in a case of optimization having an object of maximizing an effect of the task, an expression given by Expression (1) is stored in the optimization index information 142.

$$\text{maximize} \sum_{t} v^{o}_{p_n,t} \tag{1}$$

In a case of optimization having an object of maximizing an outflow amount of the items from the final process in a task executed at a plurality of locations, an expression given by Expression (2) is stored in the optimization index information 142.

$$\text{maximize} \min_{l\in L} \sum_{t} v^{o}_{l,p_n,t} \tag{2}$$

In a case of optimization having an object of minimizing workloads among the resources, an expression given by Expression (3) is stored in the optimization index information 142.

$$\text{minimize} \max_{(w_1,w_2)\in W\times W} \left| \sum_{p\in P} \alpha_p \left[ \sum_{l\in L,t\in T} l_{w_1,l,p,t} - l_{w_2,l,p,t} \right] \right| \tag{3}$$

In this expression, $l_{w,l,p,t}$ represents a function that takes 1 only when a resource w is allocated to a process p in a time slot t at a location l, and takes 0 otherwise. Moreover, $\alpha_p$ represents a weight set in accordance with a magnitude of a load of a process. The weights in Expression (3) only depend on the processes, but may also depend on the resources, the locations, and the like.

Next, description is given of processing executed by the computer 100.

Figure 9A:
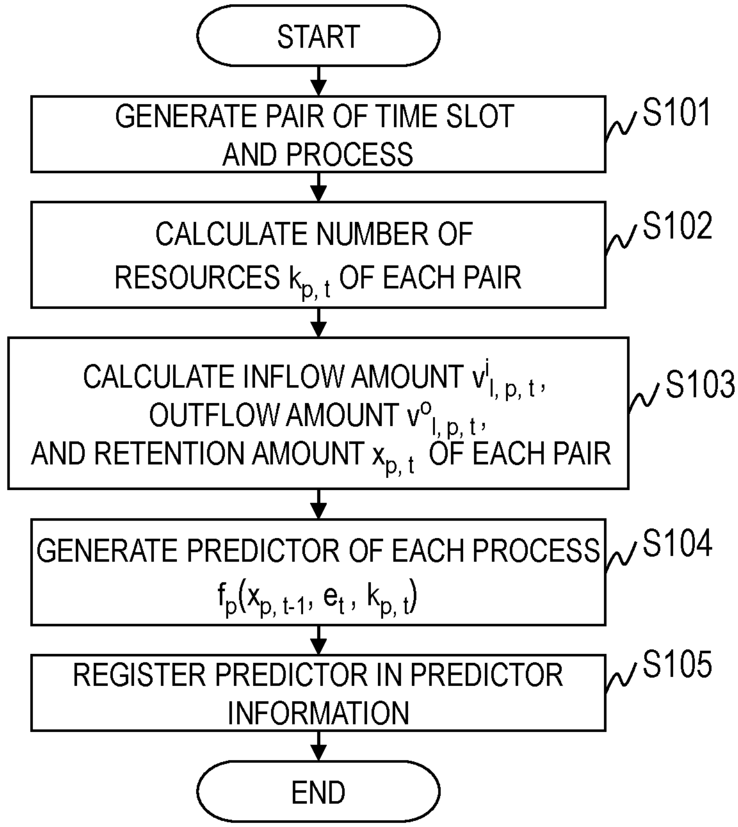
FIG. 9A and FIG. 9B are flowcharts for illustrating examples of leaning processing executed by a learning unit in the first embodiment.
Figure 9B:
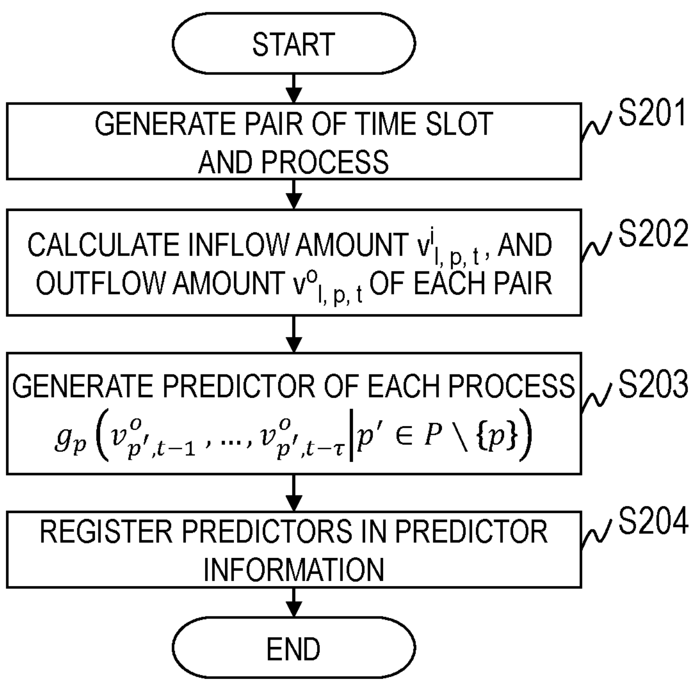

FIG. 9A and FIG. 9B are flowcharts for illustrating examples of leaning processing executed by the learning unit 121 in the first embodiment.

FIG. 9A is a flowchart for illustrating a flow of the learning processing for generating the predictor configured to calculate the predicted value of the outflow amount.

In a case where the learning unit 121 receives an execution instruction or an optimization request, or periodically, the learning unit 121 executes the learning processing illustrated in FIG. 9A. The execution timing of the leaning processing is only required to be a timing at which the predictor is generated before allocation optimization processing described later is started.

The learning unit 121 refers to the history information 131 to generate pairs of the time slot and the process (Step S101). A user may specify the time slots.

After that, the learning unit 121 refers to the history information 131 to calculate the number of resources $k_{p,t}$ of each pair (Step S102).

After that, the learning unit 121 refers to the history information 131 to calculate the inflow amount $v^{i}_{l,p,t}$ the outflow amount $v^{o}_{l,p,t}$, and a retaining amount $x_{p,t}$ of each pair (Step S103).

After that, the learning unit 121 generates the predictor configured to predict an outflow amount of the items of each process p based on $k_{p,t}$, $v^{o}_{p,t}$, $x_{p,t}$ and the environmental data $e_t$ (Step S104). In the first embodiment, it is assumed that a linear function $f_p(x_{p,t-1}, e_t, k_{p,t})$ is generated as the predictor. A publicly-known algorithm is only required to be used as the learning algorithm, and a detailed description thereof is therefore omitted. Moreover, information to be used for the learning is not limited to the above-mentioned information, and, for example, the inflow amount $v^{i}_{p,t}$ of this process in this time slot may be used for the learning.

After that, the learning unit 121 registers the predictor of each process in the predictor information 133 (Step S105), and then, finishes the processing.

It should be noted that the values to be used to generate the predictor are an example, and are not limited to the example. For example, a predictor having the outflow amounts of the items of other processes and the environmental data as variables may be generated.

FIG. 9B is a flowchart for illustrating a flow of the learning processing for generating the predictor configured to calculate the predicted value of the inflow amount.

In a case where the learning unit 121 receives an execution instruction or an optimization request, or periodically, the learning unit 121 executes the learning processing illustrated in FIG. 9B. The execution timing of the leaning processing is only required to be a timing at which the predictor is generated before optimization allocation determination described later is started.

The learning unit 121 refers to the history information 131 to generate pairs of the time slot and the process (Step S201). A user may specify the time slots.

After that, the learning unit 121 refers to the history information 131 to calculate the inflow amount $v^{i}_{p,t}$ and the outflow amount $v^{o}_{p,t}$ of each pair (Step S202).

After that, the learning unit 121 generates the predictor configured to predict an inflow amount of the items of each process p based on $v^{i}_{p,t}$ and $v^{o}_{p,t}$ (Step S203). In the first embodiment, it is assumed that a linear function $g_p$ as represented by Expression (4) is generated as the predictor. A publicly-known algorithm is only required to be used as the learning algorithm, and a detailed description thereof is therefore omitted.

$$g_P(v_{p',t-1}{}^{o}, \ldots, v_{p',t-\tau}{}^{o} | p' \in P \setminus \{p\}) \tag{4}$$

In the first embodiment, the inflow amount of the first process is given as the first process inflow information 143, and a predictor configured to predict the inflow amount of the items in the first process is thus not generated.

After that, the learning unit 121 registers the predictor of each process in the predictor information 133 (Step S204), and then, finishes the processing.

Figure 10:
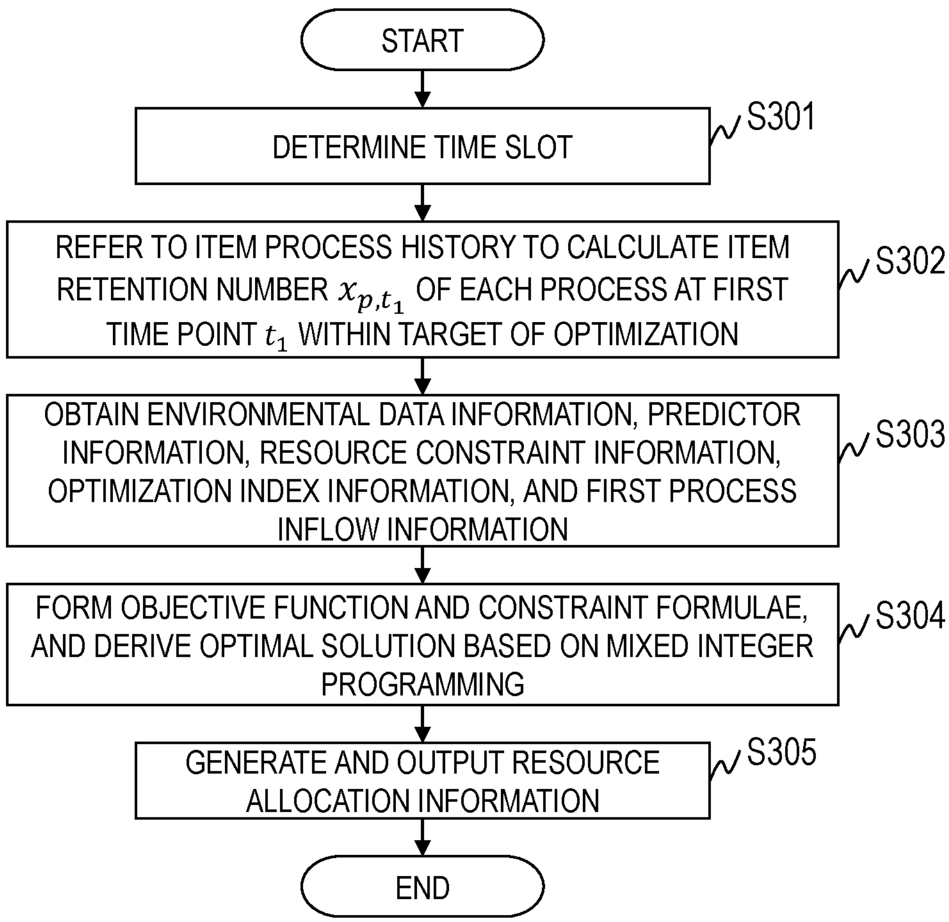
FIG. 10 is a flowchart for illustrating an example of allocation optimization processing executed by a resource allocation determining unit in the first embodiment.

FIG. 10 is a flowchart for illustrating an example of the allocation optimization processing executed by the resource allocation determining unit 122 in the first embodiment.

The resource allocation determining unit 122 determines a time slot serving as a unit of processing based on a specified time width (Step S301). Specifically, the resource allocation determining unit 122 divides the specified time width into a plurality of time slots so that the time slot is the same as the time slot used in the learning.

After that, the resource allocation determining unit 122 refers to the history information 131 to calculate the number of retention items $x_{p,t\_1}$ of each process at a first time point $t_1$ within a target of the optimization (Step S302). This corresponds to, for example, the number of items which have been left unprocessed since the day before. For the convenience of notation, $t_1$ is indicated as t_1.

After that, the resource allocation determining unit 122 obtains the environmental data information 132, the predictor information 133, the resource constraint information 141, the optimization index information 142, and the first process inflow information 143 (Step S303).

After that, the resource allocation determining unit 122 forms an objective function and constraint formulae, and derives an optimal solution based on the mixed integer programming (Step S304).

Specifically, the resource allocation determining unit 122 generates the objective function from the optimization index information 142, and forms the first process inflow information 143, the environmental data information 132, and the predictor information 133 as equality constraints relating to the number of items transitioning between processes. Moreover, the resource allocation determining unit 122 formulates the resource constraint information 141 as inequality constraints. In the first embodiment, it is assumed that the predictors are linear, and the objective function and all of the constraints are thus described as linear functions. Thus, the allocation of the resources can be obtained based on the mixed integer programming that inputs the retention number of items of each process.

Finally, the resource allocation determining unit 122 generates the resource allocation information 151 from results of the solution, and outputs the resource allocation information 151 (Step S305).

It should be noted that the predictors configured to calculate the inflow amounts and the outflow amounts of the items of all of the processes are generated, but the predictors are not always required to be generated for all of the processes. For example, in the task illustrated in FIG. 2, when the histories of the processes B and C do not exist, or when the resources are not to be allocated to the processes B and C, only the predictors configured to predict the inflow amounts and the outflow amounts of the items of the processes A, D, and E may be generated.

As described above, the computer 100 uses the predictors to obtain the inflow amount and the outflow amount of the items of each process, to thereby be able to express the transitions of the items as the linear constraints. With this configuration, the computer 100 can use the mixed integer programming, to thereby determine the optimal allocation of the resources based on the given inflow amount of the items in the first process and the given index serving as the target.

Thus, the computer 100 can determine the optimal allocation of resources in the task including the transitions between the processes such as rework.

Second Embodiment

A second embodiment of this invention is different from the first embodiment in that a predictor configured to predict the inflow amount of the items of the first process is to be generated. Description is now given of the second embodiment while focusing on the difference from the first embodiment.

The hardware configuration and the software configuration of the computer 100 in the second embodiment are the same as those in the first embodiment. However, the optimization request in the second embodiment does not include the first process inflow information 143.

In the second embodiment, the predictor configured to predict the inflow amount of the items is generated by the processing described with reference to FIG. 9B for each process other than the first process. The following processing is executed for the first process.

Figure 11:
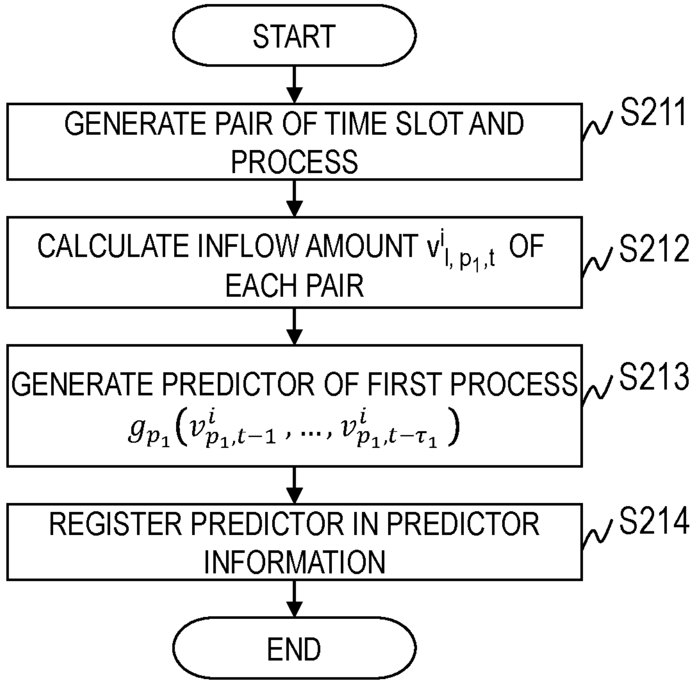
FIG. 11 is a flowchart for illustrating an example of leaning processing executed by the learning unit in a second embodiment.

FIG. 11 is a flowchart for illustrating an example of leaning processing executed by the learning unit 121 in the second embodiment.

The learning unit 121 refers to the history information 131 to thereby generate pairs of the time slot and the process (Step S211). A user may specify the time slots.

After that, the learning unit 121 refers to the history information 131 to calculate an inflow amount $v^i_{p\_1,t}$ of each pair (Step S212). For the convenience of notation, $p_1$ is indicated as p_1.

After that, the learning unit 121 generates the predictor configured to predict the inflow amount of the items of the first process $p_1$ based on $v^i_{p\_1,t}$ and the environmental data information 132 (Step S213). Specifically, a linear function $g_{p\_1}$ as given by Expression (5) is generated as the predictor. The linear function $g_{p\_1}$ is expressed as a state space model, for example, an ARIMA model. A publicly-known algorithm is only required to be used as the learning algorithm, and a detailed description thereof is therefore omitted.

$$g_{p1}(v_{p1,t-1}{}^i, \ldots, v_{p1,t-\tau_1}{}^i) \tag{5}$$

After that, the learning unit 121 registers the predictor of the first process in the predictor information 133 (Step S214), and then, finishes the processing.

The allocation optimization processing in the second embodiment is partially different in processing of Step S303 and Step S304. First, the resource allocation determining unit 122 does not obtain the first process inflow information 143 in Step S303. The resource allocation determining unit 122 instead refers to the history information 131 to obtain information required to predict the inflow amount in a first time slot within the target of the optimization. In Step S304, the resource allocation determining unit 122 uses the obtained information to change the equality constraint relating to the inflow amount of the first process to the constraint given by the function $g_{p\_1}$.

According to the second embodiment, even when the inflow amount of the items to the first process is not given, the computer 100 can determine an optimal allocation of the resources.

Third Embodiment

A third embodiment of this invention is different from the first embodiment in that the predictors generated by the learning unit 121 are not linear functions. Description is now given of the third embodiment while focusing on the difference from the first embodiment.

The hardware configuration and the software configuration of the computer 100 in the third embodiment are the same as those in the first embodiment.

A flow of processing executed by the learning unit 121 in the third embodiment is the same as those in the first embodiment and the second embodiment, but is different in predictors to be generated. For example, the predictors are generated as non-linear functions. For example, in a case where the learning unit 121 generates the predictor of the first process in the third embodiment, a state space model, for example, a particle filter, is used. Alternatively, for example, a probability model that adds disturbance, for example, is generated as the predictor.

For example, in Step S103, the learning unit 121 may divide the number of finished items by a sum of periods used by the resources for each process to calculate A, and may calculate the outflow amount of the items in each time slot based on a Poisson distribution given by Expression (6).

$$P(X=k)=\frac{\lambda^k e^{-\lambda}}{k!} \quad (6)$$

P(X=k) represents a probability that the outflow amount of the items per time slot is k.

Figure 12:
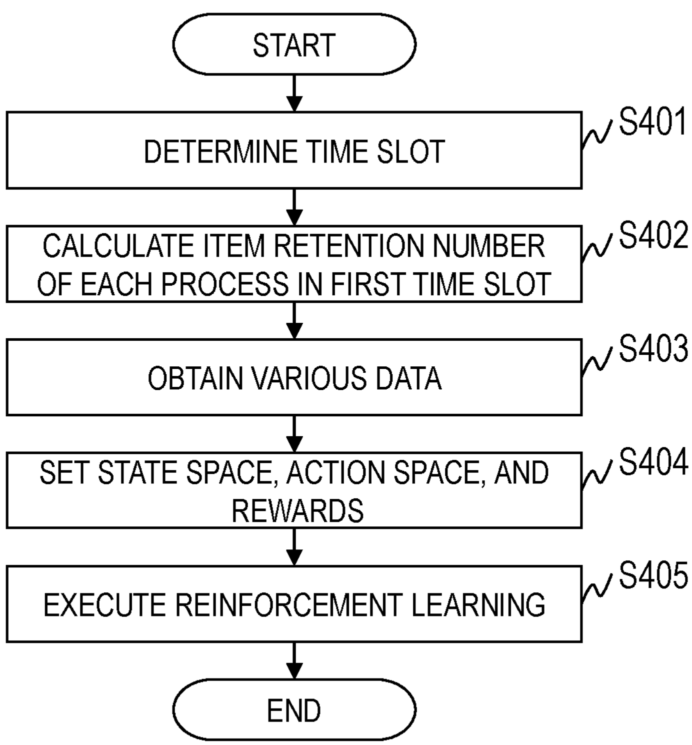
FIG. 12 is a flowchart for illustrating an example of preprocessing executed by the resource allocation determining unit in a third embodiment.

In the third embodiment, processing of generating an algorithm for determining the allocation of the resources is executed before the allocation optimization processing is executed. FIG. 12 is a flowchart for illustrating an example of preprocessing executed by the resource allocation determining unit 122 in the third embodiment.

The resource allocation determining unit 122 determines a time slot serving as a unit of processing based on a specified time width (Step S401).

After that, the resource allocation determining unit 122 selects the amount $x_{p,t\_1}$ of retention of the items of each process in a first time slot (Step S402). For the convenience of notation, $t_1$ is indicated as t_1.

After that, the resource allocation determining unit 122 obtains the environmental data information 132, the predictor information 133, the resource constraint information 141, and the optimization index information 142 (Step S403).

After that, the resource allocation determining unit 122 sets a state space, an action space, and rewards in reinforcement learning (Step S404). Those settings are stored in the work area or the storage device 103.

In this case, the state space includes information to be input to the predictor information 133, and includes, for example, the number of steps until an end time point, the number of items retained in each process, and the number of resources to be allocated to each process. The action space is defined so as to represent transitions between states. For example, when a state at a time point $t_m$ can transition to only states at a time point $t_{m+1}$, and there is a threshold value for the number of allocable resources, the transition is allowed only between states satisfying those constraints. The reward is defined as, for example, a gain of the objective function at the time when this transition occurs. The reward may be a weighted sum of a plurality of the gains of the objective functions.

After that, the resource allocation determining unit 122 learns a state value function, an action value function, and a policy based on an algorithm of the reinforcement learning (Step S405). After that, the resource allocation determining unit 122 finishes the preprocessing.

The learning may be learning through use of a method of heuristic optimization or the like. Moreover, when the predictor configured to predict the outflow amount is based on a Poisson distribution, and the predictor configured to predict the inflow amount is a deterministic (non-probabilistic) predictor, the resource allocation determining unit 122 uses dynamic programming, to thereby be able to learn the state value function, the action value function, and the policy.

The allocation optimization processing in the third embodiment is the same as that in the first embodiment. However, in Step S304, the resource allocation determining unit 122 determines an optimal allocation of the resources based on the policy generated by the preprocessing, for example.

The state value function, the action value function, and the policy can be used also for a real-time allocation of the resources at each time point.

Figure 13:
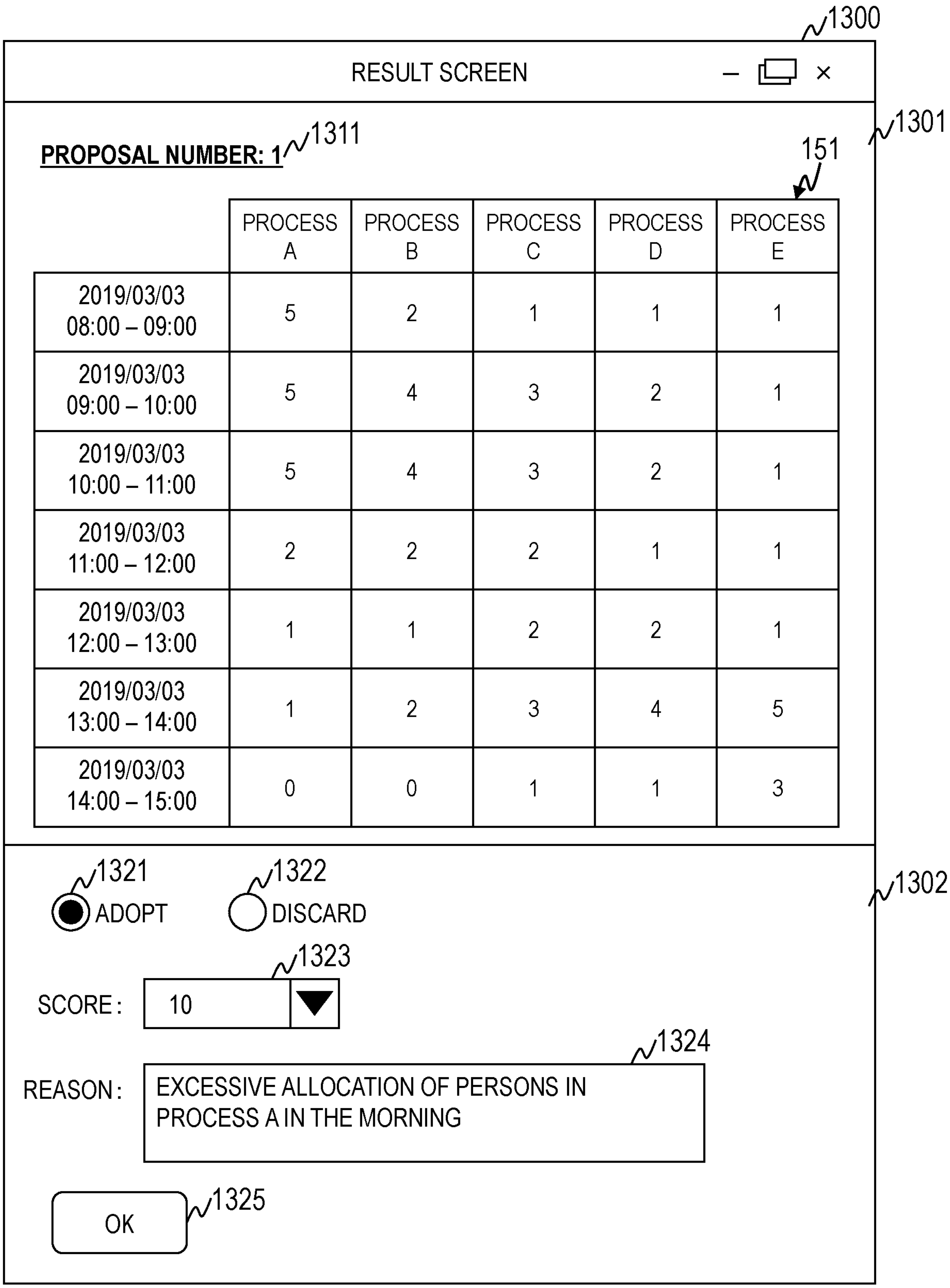
FIG. 13 is a diagram for illustrating an example of a result screen presented by the computer in the third embodiment.

The computer 100 may provide an interface configured to receive an evaluation of the resource allocation by the user after the resource allocation information 151 is output. FIG. 13 is a diagram for illustrating an example of a result screen 1300 presented by the computer 100 in the third embodiment.

The result screen 1300 is an example of an interface configured to receive the evaluation of the resource allocation by the user. The result screen 1300 includes a result display field 1301 and an evaluation field 1302.

The result display field 1301 includes a selection field 1311. The user operates the selection field 1311, to thereby select the resource allocation information 151 to be referred to. In the result display field 1301, the specified resource allocation information 151 is displayed.

The evaluation field 1302 includes radio buttons 1321 and 1322, a score input field 1323, a reason input field 1324, and an OK button 1325.

The radio buttons 1321 and 1322 are radio buttons to be used to select whether or not the resource allocation information 151 is adopted. When the resource allocation information 151 is to be adopted, the radio button 1321 is operated. When the resource allocation information 151 is not to be adopted, the radio button 1322 is operated.

The score input field 1323 is a field for inputting a score representing the evaluation of the resource allocation information 151. In FIG. 13, the score is displayed in a form of a pulldown menu.

The reason input field 1324 is a field for inputting a reason for the evaluation of the resource allocation information 151.

The OK button 1325 is an operation button for outputting details of the operation of the evaluation field 1302.

In a case where the presented resource allocation information 151 is not adopted, the computer 100 automatically updates an algorithm for optimizing the resource allocation, for example, the rewards. Moreover, an administrator of the computer 100 may refer to the score, the evaluation reason, and the like, to thereby update this algorithm. As described above, the algorithm for optimizing the resource allocation can be adjusted through use of the evaluation result.

As described above, the computer 100 uses the predictors to obtain the inflow amount and the outflow amount of the items of each process, to thereby be able to simulate the transitions of the items. With this configuration, the computer 100 can determine the optimal allocation of the resources based on the reinforcement learning.

Thus, the computer 100 can determine the optimal allocation of resources in the task including the transitions between the processes such as rework.

The present invention is not limited to the above embodiment and includes various modification examples. In addition, for example, the configurations of the above embodiment are described in detail so as to describe the present invention comprehensibly. The present invention is not necessarily limited to the embodiment that is provided with all of the configurations described. In addition, a part of each configuration of the embodiment may be removed, substituted, or added to other configurations.

A part or the entirety of each of the above configurations, functions, processing units, processing means, and the like may be realized by hardware, such as by designing integrated circuits therefor. In addition, the present invention can be realized by program codes of software that realizes the functions of the embodiment. In this case, a storage medium on which the program codes are recorded is provided to a computer, and a CPU that the computer is provided with reads the program codes stored on the storage medium. In this case, the program codes read from the storage medium realize the functions of the above embodiment, and the program codes and the storage medium storing the program codes constitute the present invention. Examples of such a storage medium used for supplying program codes include a flexible disk, a CD-ROM, a DVD-ROM, a hard disk, a solid state drive (SSD), an optical disc, a magneto-optical disc, a CD-R, a magnetic tape, a non-volatile memory card, and a ROM.

The program codes that realize the functions written in the present embodiment can be implemented by a wide range of programming and scripting languages such as assembler, C/C++, Perl, shell scripts, PHP, Python and Java.

It may also be possible that the program codes of the software that realizes the functions of the embodiment are stored on storing means such as a hard disk or a memory of the computer or on a storage medium such as a CD-RW or a CD-R by distributing the program codes through a network and that the CPU that the computer is provided with reads and executes the program codes stored on the storing means or on the storage medium.

In the above embodiment, only control lines and information lines that are considered as necessary for description are illustrated, and all the control lines and information lines of a product are not necessarily illustrated. All of the configurations of the embodiment may be connected to each other.

What is claimed is:

1. A computer system, which includes at least one computer, and which is configured to determine an allocation of resources in a task formed of a plurality of processes of processing items through use of the resources, the at least one computer including an arithmetic device, a storage device, and an interface, the storage device being coupled to the arithmetic device, the interface being coupled to the arithmetic device and being configured to couple to an external device, the task including a transition between processes corresponding to rework, the computer system comprising:

at least one predictor configured to calculate predicted values of an inflow amount and an outflow amount of the items of each of the plurality of processes forming the task; and a resource allocation determining unit configured to determine an allocation of the resources to each of the plurality of processes, and the resource allocation determining unit being configured to:

use the at least one predictor to form a simulator configured to calculate the predicted values of the inflow amount and the outflow amount of the items of each of the plurality of processes in any allocation of the resources, in a case of receiving a request including a constraint condition of the resources and an optimization condition; and determine the allocation of the resources to each of the plurality of processes based on the simulator, the constraint condition of the resources, and the optimization condition.

2. The computer system according to claim 1, further comprising a learning unit configured to generate, for each of the plurality of processes, an inflow amount predictor configured to calculate the predicted value of the inflow amount of the items and an outflow amount predictor configured to calculate the predicted value of the outflow amount of the items, wherein the inflow amount predictor configured to calculate the predicted value of the inflow amount of the items to the first process of the task is generated as one of a state space model and an ARIMA model.

3. The computer system according to claim 1, wherein the optimization condition is any one of leveling of loads on the resources and maximization of an effect of the task.

4. The computer system according to claim 1, wherein the resource allocation determining unit is configured to use an algorithm of any one of mixed integer programming, dynamic programming, and reinforcement learning, to thereby determine the allocation of the resources to each of the plurality of processes.

5. The computer system according to claim 1, wherein the resource allocation determining unit is configured to provide the interface for presenting the determined allocation of the resources to each of the plurality of processes, and for receiving an evaluation of the allocation of the resources.

6. A method for determining of resource allocation in a task formed of a plurality of processes of processing items through use of resources, the method being executed by a computer system including at least one computer, the at least one computer including an arithmetic device, a storage device, and an interface, the storage device being coupled to the arithmetic device, the interface being coupled to the arithmetic device and being configured to couple to an external device, the task including a transition between processes corresponding to rework, the computer system including at least one predictor configured to calculate predicted values of an inflow amount and an outflow amount of the items of each of the plurality of processes forming the task, and the method for determining of resource allocation including:

a first step of using, by the at least one computer, the at least one predictor to form a simulator configured to calculate the predicted values of the inflow amount and the outflow amount of the items of each of the plurality of processes in any allocation of the resources, in a case of receiving a request including a constraint condition of the resources and an optimization condition; and a second step of determining, by the at least one computer, an allocation of the resources to each of the plurality of processes based on the simulator, the constraint condition of the resources, and the optimization condition.

7. The method for determining of resource allocation according to claim 6, further including generating, by the at the least one computer, for each of the plurality of processes, an inflow amount predictor configured to calculate the predicted value of the inflow amount of the items and an outflow amount predictor configured to calculate the predicted value of the outflow amount of the items, wherein the inflow amount predictor configured to calculate the predicted value of the inflow amount of the items to the first process of the task is generated as one of a state space model and an ARIMA model.

8. The method for determining of resource allocation according to claim 6, wherein the optimization condition is any one of leveling of loads on the resources and maximization of an effect of the task.

9. The method for determining of resource allocation according to claim 6, wherein the second step includes using, by the at least one computer, an algorithm of any one of mixed integer programming, dynamic programming, and reinforcement learning, to thereby determine the allocation of the resources to each of the plurality of processes.

10. The method for determining of resource allocation according to claim 6, further including providing, by the at least one computer, the interface for presenting the determined allocation of the resources to each of the plurality of processes, and for receiving an evaluation of the allocation of the resources.

* * * * *